Figure 1:
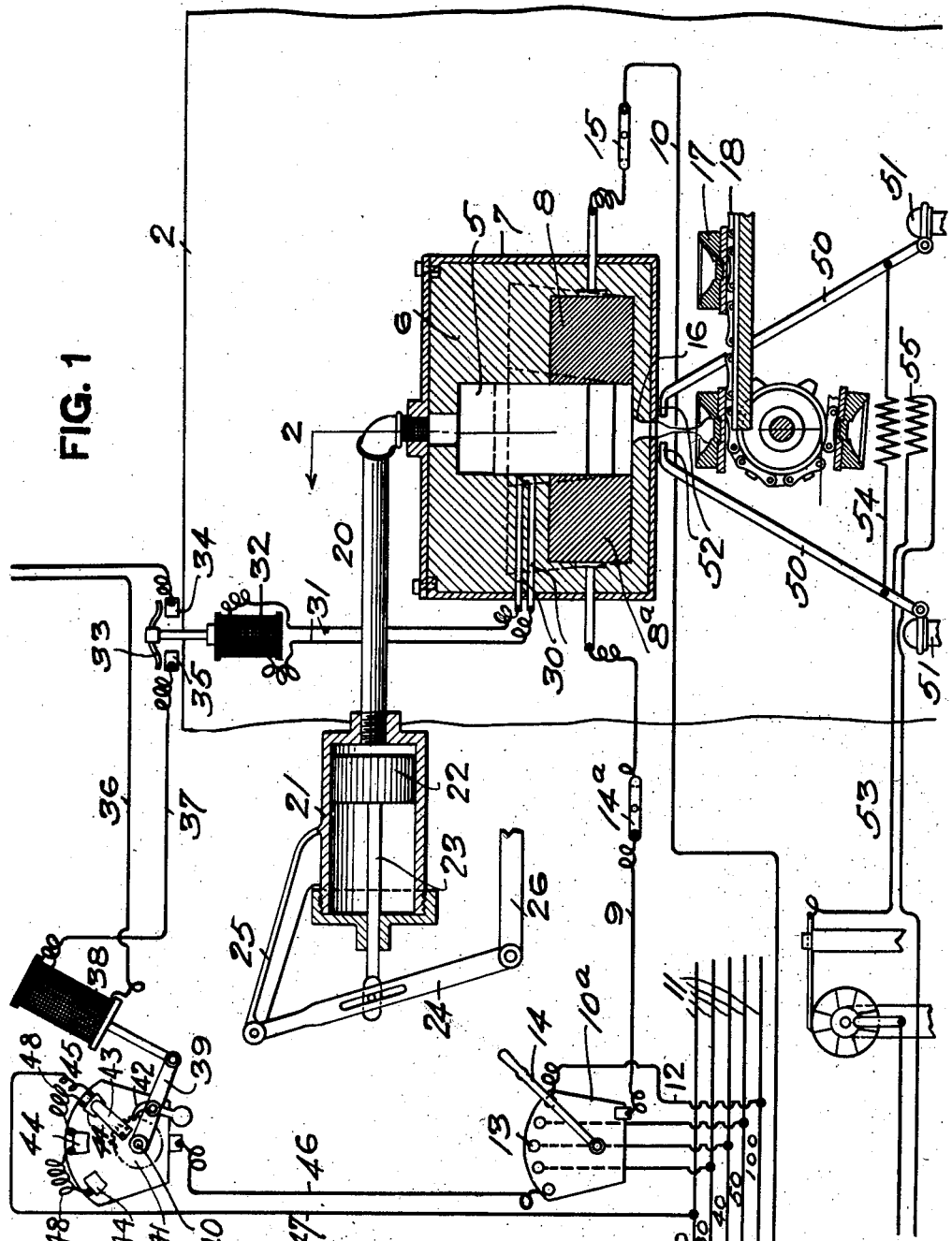

L. W. PROEGER.
METHOD OF FEEDING MOLTEN GLASS TO MOLDS.
APPLICATION FILED AUG. 30, 1909.

1,059,634.

Patented Apr. 22, 1913.

2 SHEETS—SHEET 1.

WITNESSES.

INVENTOR.

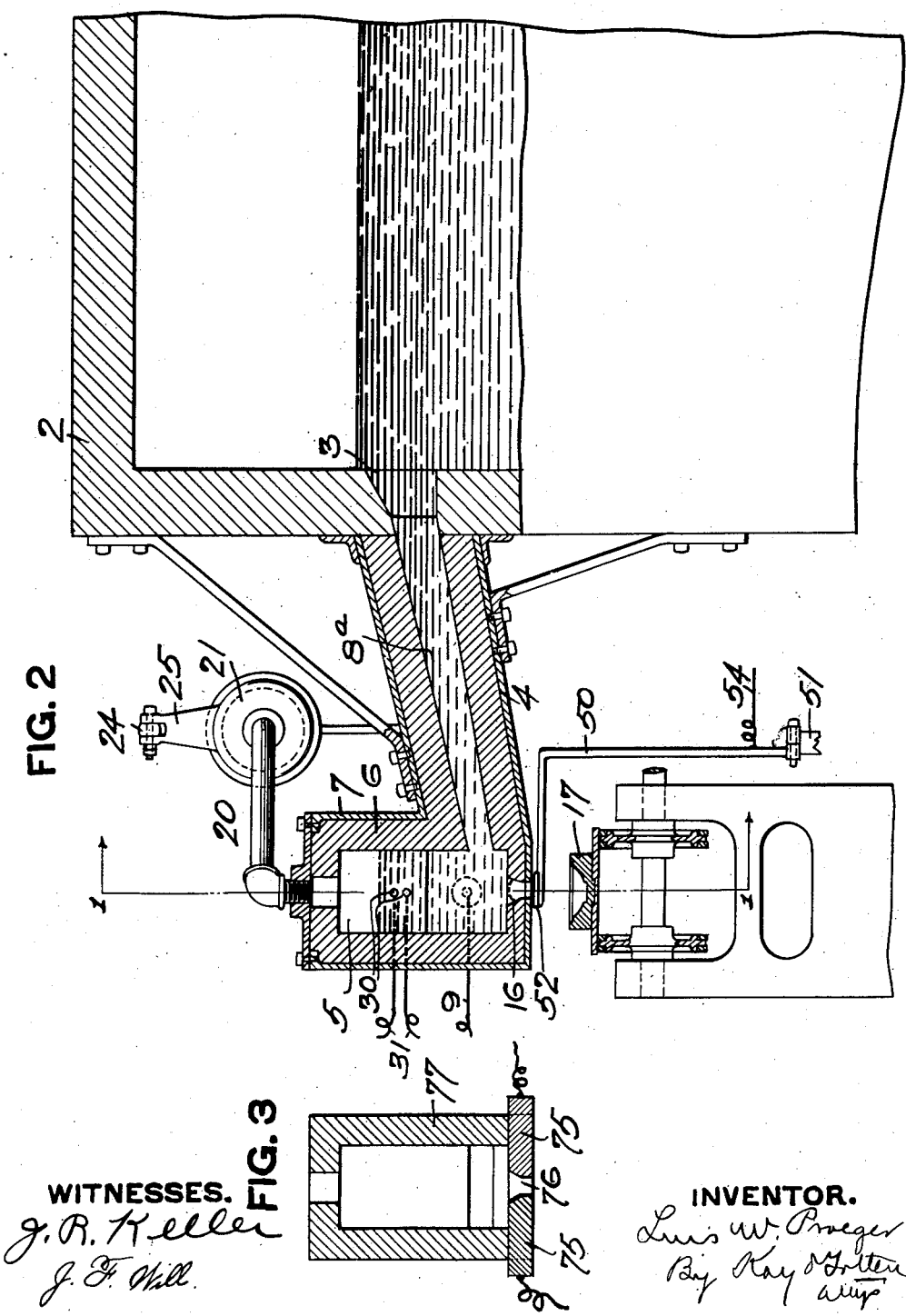

UNITED STATES PATENT OFFICE.

LUIS W. PROEGER, OF PITTSBURGH, PENNSYLVANIA.

METHOD OF FEEDING MOLTEN GLASS TO MOLDS.

1,059,634.  Specification of Letters Patent.  Patented Apr. 22, 1913.

Application filed August 30, 1909. Serial No. 515,271.

*To all whom it may concern:*

Be it known that I, LUIS W. PROEGER, a resident of Pittsburgh, in the county of Allegheny and State of Pennsylvania, have invented a new and useful Improvement in Methods of Feeding Molten Glass to Molds; and I do hereby declare the following to be a full, clear, and exact description thereof.

My invention relates to a process of feeding molten glass to molds and while more particularly to that branch of the art in which the glass is conducted in a freely flowing stream from the furnace to the molds which move into position one at a time to receive their propor proportion of glass to form the desired article, yet its application has a wider scope than the mere feeding to molds, as fully hereinafter set forth.

Heretofore, it has been customary to employ some mechanical device, such as a knife, to cut off the supply of molten glass when a mold has been filled and one is being moved up in position to be filled. Another expedient has been to interpose a vessel of some kind to catch the glass during the time required to bring another mold into position, and the glass is discharged from this intermediate vessel into the mold. Or still another expedient has been resorted to in the shape of a stopper which is moved into position to stop up the orifice each time a mold has been filled and while the next mold is coming into position to be filled.

The object of my invention is to provide a method or process of feeding the molten glass to molds in which the stream of molten glass is uninterrupted in the sense of being broken or cut off by some mechanical device.

The further object of my invention is to provide for the maintaining of the flowing glass at such a high temperature as will insure its being in the proper condition for flowing freely, while at the same time the temperature may be readily varied to suit different conditions.

To these ends my invention comprises, generally stated, the process of feeding molten glass to molds, consisting in conducting the freely flowing glass from the furnace or melting receptacle and cutting off the flow of glass to the mold by means of a vacuum.

My invention further comprises the heating of the stream of glass by means of electricity, all as hereinafter set forth and claimed.

In the accompanying drawings, Figure 1 is a front elevation partly in section of apparatus for carrying out my improved process; Fig. 2 is a section on the line (2—2) Fig. 1; and Fig. 3 is a modified form of apparatus.

The apparatus for carrying out my invention may be varied from that illustrated, which is a simple form in which the numeral 2 designates a portion of a suitable glass melting furnace or pot with the outlet 3 which is arranged below the level of the molten glass within the furnace, said apparatus forming the subject matter of an application of even date herewith, Serial No. 515,270. A spout 4 formed of suitable refractory material is connected up with the furnace in a suitable manner in line with the discharge opening 3. The spout 4 communicates with the chamber 5, the walls 6 of which are also formed of suitable refractory material. The walls of the spout and chamber may be inclosed, for purposes, within plates 7. At opposite sides of the spout and the chamber 6 are the metal blocks or electrodes 8 and 8ª formed of iron or other suitable conducting material. These electrodes are connected up to the wires 9 and 10. The wire 9 is connected up with the suitable switch 10ª. The wires 11 leading to the switch from a suitable transformer are of different voltages, indicated, and the wires 12 connect up with the wires 11, said wires 12 being connected with the contacts 13 of the switch. The lever 14 is thrown from one point of contact to the other according to the voltage desired.

Suitable switches 14 and 15 are provided in the wires 9 and 10. When the switches 14 and 15 are turned on, the current, as illustrated in Fig. 1, will pass from the 100-volt wire to the switch and then by the wire 9 to the electrode 8ª. The molten glass in the spout will act as a conductor for the current which will be transmitted to the electrode 8, through the molten glass as a conductor, and return to ground by the wire 10. The resistance of the molten glass to the flow of the current from one electrode to the other creates the proper heat to maintain the glass at the desired temperature. If it is found that 100 volts is not necessary to maintain the glass in proper condition, lever 14 of the switch may be thrown onto the next contact when only 50 volts will pass to the electrode 8ª. The outer ends of the electrodes 8 and 8ª, which are within the chamber 5, will act in the same manner as in the spout to keep the glass in the proper condition for running, so that the glass will freely flow from the orifice 16 to be discharged into the molds 17, which may be mounted upon a chain carrier 18 moving intermittently, so as to bring the molds in succession under the orifice 16 to receive the proper amount of glass to form the article desired. The molds after being filled in this manner, pass on to position beneath a suitable press (not shown) where the article is pressed.

The pipe 20 is connected up to the upper end of the chamber 5, and said pipe is connected up to the cylinder 21 supported in any suitable manner. Within the cylinder 21 is the piston 22 which is connected up to the piston-rod 23. This piston-rod 23 passes out through a suitable guide box and is connected to the lever 24. The upper end of the lever 24 is connected to the bracket-arm 25 and the lower end of said lever is connected to the strap or rod 26 which may be connected up to a suitable mechanism for operating lever 24 intermittently, or the operation may be done by hand if desired.

When the operation of discharging the glass from the furnace is discontinued for any reason, it is desirable to maintain the glass within the spout 4 and chamber 5 in such condition that it will not flow and yet not be cold enough to form a hard, solid mass, and for this purpose I employ the following controlling mechanism: The thermo-couple 30 passes through the walls of the chamber 5 and is in contact with the glass within the said chamber. The heat from the glass generates the electricity in the thermo-couple and this is conducted through wires 31 to the solenoid 32. This solenoid 32 is constructed to operate at a fixed temperature, and when the heat of the glass rises above that point, the solenoid will be operated by the current generated by the thermo-pile. The switch 33 is connected to the solenoid and said switch is adapted to unite the contacts 34 and 35. Wires 36 and 37 lead from the contacts 34 and 35 to the solenoid 38. Connected up to the solenoid 38 is the arm 39. The arm 39 is mounted on shaft 40 on which is carried the toothed wheel 41. The weighted pawl 42 on the arm 39 engages the teeth on wheel 41. On the wheel 41 is the arm 43, which is adapted to engage the contacts 44 of the rheostat 45. A wire 46 connects the contact of the rheostat to the switch 10ª and the wire 47 connects the contact of the rheostat with the wire 11 of 20 volts.

Under ordinary conditions, let us assume that a current of twenty volts will maintain the glass in such condition in the spout that it will not flow. If the temperature of the glass rises above the point where it will not flow, the current is reduced automatically through the resistance coils 48, which are placed in circuit by the arm 43 operated through the solenoids 32 and 38, whereby the glass is maintained at the proper temperature so as not to flow.

As soon as the electricity generated by the thermo-pile operates solenoid 32 to close the switch 33, the solenoid 38 will operate the arm 39 so as to throw the arm 43 into contact with one of the contacts 44, the resistance coils 48 acting to increase the resistance. As the only current passing through the electrodes 8 and 8ª is carried from the 20-volt wire, the glass is not in a molten state and the voltage is further controlled by the rheostat so as to maintain the glass in the chamber 5 and the spout at the proper condition of viscosity. It is constantly maintained at such a temperature that by increasing the voltage to the electrodes 8 and 8ª when desired, the glass contained therein may be quickly raised to the proper temperature to make it flow freely as before. In this way I dispense with the necessity of remelting a solid, cold body of glass which would require a much greater heat and a longer time.

If, however, the glass in the spout should be cold and in the form of a solid mass of glass, the current is turned on and the current passes by way of the molten glass, or in line of least resistance, at the furnace outlet 3, which is close to the inner ends of the electrodes. The solid mass in the trough is gradually heated and reduced to a molten state, beginning at the inner end and continuing until there is a flowing stream of glass leading from the furnace to the molds. The amount of heat generated by an electric current within a conductor varies as the resistance and the square of the current. The glass being of a much higher specific resistance than the rest of the current becomes highly heated and is maintained at a flowing temperature.

The total amount of glass heated by a current in a given time varies directly as the amount of heat evolved by the current. The heat evolved is varied in the following manner: In a given stream of glass, the resistance remaining the same, the current passing will vary directly as the voltage. By reducing the voltage, the current is reduced, the heat evolved varying as the square of the current, changing the amount of glass heated in a given time in proportion. In this manner I can arrange the rate of discharge at will. By changing the amount of current I can maintain the flowing stream at any temperature and can vary the amount of glass discharged per minute. For instance, if with a voltage of 50 the discharge of glass equals 12 pounds per minute, then by decreasing the amount of current the discharge of glass is decreased in proportion. For different articles of glassware it is of great value to have slight differences in temperature of the glass. An article weighing 15 ounces may be shaped at a lower temperature than an article weighing 4 ounces, and this variation in temperature I readily obtain by the proper variation in the quantity of current passing through the glass. I have found that the amount of current passing is subjected to very slight fluctuations and so the temperature and rate of flow are very constant.

In carrying out my invention with the above described apparatus, the molten glass within the furnace 2 being raised to the proper temperature, flows freely therefrom through the discharge outlet 3 as far as the inner ends of the electrodes, thereby forming a circuit for the current. The current, meanwhile, has been turned on so that the heat generated by the resistance of the molten glass will act to prevent the chilling of the glass in the spout and chamber 5, and will maintain it in such a state of fluidity that it will flow freely. The molds 17 are brought in succession into position to receive the glass flowing from the orifice 16. When sufficient glass has been discharged into a mold, said mold is moved away and another mold is brought into position to be charged. Pending the movement of the empty mold into position to be filled, the stream of glass flowing from the orifice 16 is interrupted for a sufficient length of time to permit the empty mold to be brought into position and this interruption of the stream of glass is obtained by means of a vacuum. To create the vacuum, the piston 22 in the cylinder 21 is moved outwardly and a vacuum or partial vacuum, is created in the chamber 5 which will draw or suck up the molten glass within the chamber and for the time required to bring a new mold into position will cut off the supply of molten glass flowing through the orifice 16. By having the discharge outlet 3 of the furnace below the level of the glass in said furnace, it is possible to create the vacuum in the above manner and the operation of the piston 22 is timed so as to fit in with the movement of the mold-carrier, so that the flow of glass is cut off the instant a mold has been filled and remains cut off until the next mold is brought into position to receive the glass, when the piston 22 moves inwardly and the vacuum is destroyed, and the molten glass allowed to flow freely from the orifice 16.

In case there should be any threads or drippings of the glass hanging below the orifice 16, when the flow of glass therefrom is interrupted in the above manner set forth, I provide for the removal of such glass in the following way: The metal rods 50 are secured to the insulators 51 and the upper ends of said rods have the inwardly projecting ends 52 at opposite sides of the orifice 16. The secondary wires 54 are connected up to the rods 50, the transformers 55 being employed. The primary circuit 53 is energized intermittently to correspond with the stopping of the flow of glass by the vacuum. A disruptive spark occurs between the ends 52 and acts to sever or remove any drippings or threads of glass extending below the orifice 16, when the flow of glass is arrested as above set forth.

By my process I employ no mechanical contrivance between the discharge orifice and the mold to cut off the supply of glass, but there is a stream of glass which is interrupted or supported intermittently by the action of the vacuum in such a manner as to feed the molds successively as they are brought up into position.

In Fig. 3 I have shown a slightly different form of apparatus in which the electrodes 15 are located at the discharge opening or spout 76 of the receptacle 77. In this manner the stream of glass flowing through the spout 76 is maintained at the proper temperature. The stream of glass in this case is a short one only extending through the spout 76, and not in a long stream as shown in Fig. 2. The heating action, however, may be controlled in the same manner, and the stream of glass flowing through the spout 76 is maintained at a proper state of fluidity by the electrodes 75.

What I claim is:

1. The process of feeding molten glass to molds, consisting in conducting the glass from the furnace or other receptacle in a flowing stream and cutting off the stream by means of a vacuum.

2. The process of feeding molten glass to molds, consisting in conducting the glass from the furnace or other receptacle and intermittently cutting off the flowing stream solely by means of a vacuum.

3. The process of feeding molten glass to molds, consisting in conducting the glass from the furnace or other receptacle in a flowing stream to a bottom port and cutting off the flow of glass through said port by means of a vacuum.

4. The process of feeding molten glass to molds, consisting in conducting the glass from the furnace or other receptacle in a flowing stream through a bottom port, carrying the molds under said port and intermittently cutting off the flow of molten glass through said port by means of a vacuum.

5. The process of feeding molten glass to molds, consisting in carrying the glass from the melting chamber through a passage into a separate chamber having a bottom port and cutting off the flow of glass through said port solely by means of a vacuum formed within said separate chamber.

6. The process of feeding molten glass to molds, consisting in conducting the glass from a furnace or other receptacle in a stream flowing through a bottom port, and cutting off the glass at or within said port by means of a vacuum.

7. The process of feeding molten glass to molds, consisting in conducting the glass from a furnace or other receptacle in a stream flowing through a bottom port, and cutting off the glass at or within said port by means of a vacuum formed above the body of glass.

In testimony whereof, I, the said LUIS W. PROEGER, have hereunto set my hand.

LUIS W. PROEGER.

Witnesses:
ROBT. D. TOTTEN,
WM. A. STEINMEYER.